United States Patent
Wu

(10) Patent No.: US 9,483,493 B2
(45) Date of Patent: Nov. 1, 2016

(54) METHOD AND SYSTEM FOR ACCESSING A DISTRIBUTED FILE SYSTEM

(71) Applicant: Tencent Technology (Shenzhen) Company Limited, Shenzhen (CN)

(72) Inventor: Yunjia Wu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/157,188

(22) Filed: May 17, 2016

(65) Prior Publication Data

US 2016/0259812 A1    Sep. 8, 2016

Related U.S. Application Data

(63) Continuation of application No. PCT/CN2014/079651, filed on Jun. 11, 2014.

(30) Foreign Application Priority Data

Dec. 11, 2013 (CN) .......................... 2013 1 0673855

(51) Int. Cl.
*G06F 15/16* (2006.01)
*G06F 17/30* (2006.01)
*H04L 29/08* (2006.01)

(52) U.S. Cl.
CPC ......... *G06F 17/30203* (2013.01); *H04L 67/06* (2013.01); *H04L 67/1027* (2013.01)

(58) Field of Classification Search
CPC .................................................. H04L 67/1027
USPC ....................................................... 709/219
See application file for complete search history.

(56) References Cited

U.S. PATENT DOCUMENTS 6,486,439 B1 * 11/2002 Spear ................... B23K 9/1062
219/136
6,842,906 B1 * 1/2005 Bowman-Amuah ... G06F 9/465
718/104

(Continued)

FOREIGN PATENT DOCUMENTS

CN      201781506 U     3/2011
CN      102710465 A    10/2012

(Continued)

OTHER PUBLICATIONS

Islam, N.S. High Performance RDMA-based Design of HDFS over InfiniBand. 2012. IEEE. pp. 1-12.*

(Continued)

*Primary Examiner* — Imad Hussain
(74) *Attorney, Agent, or Firm* — Morgan, Lewis & Bockius LLP

(57) ABSTRACT

A method and system for accessing an HDFS is disclosed. In some embodiments, a method of providing access to an HDFS includes: at an interface server having one or more processors and memory: maintaining a respective connection pool comprising a respective plurality of persistent connections to the HDFS; receiving respective access requests from a plurality of accessing devices to access the HDFS; creating a corresponding Hadoop operation for each of the respective access requests received from the plurality of accessing devices; and executing the corresponding Hadoop operation created for each of the respective access requests through a respective set of persistent connections selected from the respective connection pool maintained by the interface server.

20 Claims, 7 Drawing Sheets

(56) References Cited

U.S. PATENT DOCUMENTS

| | | | |
|---|---|---|---|
| 2004/0003085 A1* | 1/2004 | Joseph | H04L 69/162 709/226 |
| 2005/0103767 A1* | 5/2005 | Kainec | B23K 9/10 219/130.5 |
| 2011/0191442 A1* | 8/2011 | Ovsiannikov | H04L 63/0272 709/218 |
| 2011/0264905 A1* | 10/2011 | Ovsiannikov | H04L 29/08792 713/151 |
| 2013/0024496 A1* | 1/2013 | Krishnan | G06F 9/505 709/203 |
| 2013/0167139 A1* | 6/2013 | Arcilla | G06F 21/57 717/175 |
| 2014/0310714 A1* | 10/2014 | Chan | G06F 17/30598 718/102 |
| 2015/0127682 A1* | 5/2015 | Phelan | G06F 21/6236 707/782 |
| 2015/0234869 A1* | 8/2015 | Chan | G06F 17/30312 707/603 |
| 2016/0007083 A1* | 1/2016 | Gurha | H04N 21/44222 725/13 |

FOREIGN PATENT DOCUMENTS

| | | |
|---|---|---|
| CN | 102710766 A | 10/2012 |
| CN | 103312624 A | 9/2013 |
| CN | 103401905 A | 11/2013 |

OTHER PUBLICATIONS

Tencent Technology. ISR, PCT/CN2014/079651, Sep. 26, 2014, 3 pgs.

Tencent Technology, Written Opinion, PCT/CN2014/079651, Sep. 26, 2014, 3 pgs.

Tencent Technology, IPRP, PCT/CN2014/079651, Jun. 14, 2016, 4 pgs.

\* cited by examiner

METHOD AND SYSTEM FOR ACCESSING A DISTRIBUTED FILE SYSTEM

RELATED APPLICATION

This application is a continuation application of PCT Patent Application No. PCT/CN2014/079651, entitled "METHOD AND SYSTEM FOR ACCESSING A DISTRIBUTED FILE SYSTEM" filed on Jun. 11, 2014, which claims priority to Chinese Patent Application No. 201310673855.6, entitled "Method, System, and Apparatus for Accessing a Hadoop Distributed File System", filed on Dec. 11, 2013, both of which are incorporated by reference in their entirety.

TECHNICAL FIELD

The present disclosure relates generally to the field of data processing technology, and in particular, to a method, system and apparatus for accessing a Hadoop Distributed File System (HDFS).

BACKGROUND

Hadoop is a basic framework for establishing a distributed system, through which a user can develop a program for distribution without understanding the underlying details of the distributed system, and realize the high speed of operation and storage by fully utilizing the power of aggregation.

Hadoop Distributed File System (HDFS) is a distributed file system used by Hadoop, which is suitable for storing and processing big data, and is of high fault tolerance and high throughput.

In products that involve serving and processing big data, the use of HDFS provides an efficient, quick, and matured solution that exploits the characteristics of HDFS for storing massive amounts of data and providing external services based on the data.

Conventionally, there are two kinds of ways for accessing the HDFS:

1) Accessing the HDFS by calling through a Hadoop client, where the Hadoop client is a control tool provided by the Hadoop for reading/writing the HDFS, and the calling is accomplished by a command line input; and 2) Accessing the HDFS through programming using the library functions in the Libhdfs, where the underlying execution of the Libhdfs functions still relies on a Hadoop client.

Thus, a Hadoop client is required to be installed and running on the accessing apparatus if the access to the HDFS is to be accomplished through manners 1) and 2) above. FIG. 1 is a schematic diagram showing the relationship between an accessing device and the HDFS in a conventional configuration. As shown in FIG. 1, the Hadoop client is required to be installed and running on each accessing apparatus that wishes to access the HDFS.

Thus, in practical applications involving access to the HDFS, a problem of high implementation cost for upgrading the current version of the Hadoop client on each accessing apparatus arises when the total number of the accessing apparatus is larger, for example, over hundreds and even thousands.

Furthermore, it is relatively slow and inefficient to realize the access through calls to the Hadoop client for each access, while it is difficult to create and maintain the programs for using the Libhdfs libraries.

SUMMARY

In the present disclosure, a method and system for accessing an HDFS is disclosed.

In some embodiments, a method of providing access to an HDFS includes: at an interface server having one or more processors and memory: maintaining a respective connection pool comprising a respective plurality of persistent connections to the HDFS; receiving respective access requests from a plurality of accessing devices to access the HDFS; creating a corresponding Hadoop operation for each of the respective access requests received from the plurality of accessing devices; and executing the corresponding Hadoop operation created for each of the respective access requests through a respective set of persistent connections selected from the respective connection pool maintained by the interface server.

In some embodiments, a method of accessing an HDFS includes: at an accessing device having one or more processors and memory: in response to detecting a respective need to access the HDFS, selecting an interface server from a plurality of interface servers connected to the HDFS, wherein each interface server maintains a respective connection pool comprising a respective plurality of persistent connections to the HDFS; and sending an access request to the selected interface server based on the respective need to access the HDFS, wherein the selected interface server creates a corresponding Hadoop operation for the access request; and executes the corresponding Hadoop operation through a respective set of persistent connections selected from the respective connection pool maintained by the selected interface server.

In some embodiments, a device (e.g., an interface server, an accessing device, etc.) includes one or more processors; and memory storing one or more programs for execution by the one or more processors, wherein the one or more programs include instructions for performing the operations of the methods described herein. In some embodiments, a non-transitory computer readable storage medium stores one or more programs, the one or more programs comprising instructions, which, when executed by an electronic device (e.g., an interface server, an accessing device, etc.) each with one or more processors, cause the electronic device to perform the operations of the methods described herein.

In some embodiments, according to the methods disclosed herein, accessing devices can access an HDFS through an interface server. A Hadoop client is not required on each accessing device; instead, a single Hadoop client installed on the interface server can be used to provide HDFS access to many accessing devices. In general, for each HDFS, a small number of interface servers are sufficient to meet the HDFS access needs of many accessing devices. Furthermore, when the Hadoop clients need to be upgraded, the upgrade only needs to be performed on the small number of interface servers, rather than all of the accessing devices. Thus, the cost for the upgrade will be reduced.

Various other advantages of the various embodiments would be apparent in light of the descriptions below.

BRIEF DESCRIPTION OF DRAWINGS

The aforementioned embodiments as well as additional embodiments will be more clearly understood in light of the following detailed description taken in conjunction with the drawings.

Like reference numerals refer to corresponding parts throughout the several views of the drawings.

DETAILED DESCRIPTION

To address the problems in the conventional system and method for accessing an HDFS, an improved scheme for accessing the HDFS is provided herein, where an interface server is added between the layer of accessing devices and the layer of the HDFS, and the accessing device can access the HDFS through the interface server without need to directly interact with the HDFS.

An HDFS is a distributed file system used by Hadoop. The distributed file system is a block-structured file system in which individual files are broken into blocks of a fixed size. These blocks are stored across a cluster of one or more machines with data storage capacity. Individual machines in the cluster are referred to as data nodes. A file can be broken up into multiple blocks, and these blocks may be distributed on different machines. The exact manner by which the blocks are distributed to different machines may vary depending on the specific implementations and the characteristics of the blocks. Access to a file may require accessing multiple machines each storing one or more blocks of the file. Another characteristic of an HDFS is that, each block of a file is replicated across a number of machines (e.g., 3), such that when one of such machines is unavailable at the time of access, the data stored on this machine can still be accessed through the remaining machines holding the same data block.

The files inside an HDFS are stored in a particular directory managed by a data node service, but the files will be named only with block ids. One cannot interact with HDFS-stored files using ordinary file modification tools (e.g., Linux commands such as ls, cp, mv, etc) provided by the operating system. The metadata structures (e.g., the names of files and directories) of the HDFS can be modified by a large number of clients concurrently, and the modifications are all handled by a single machine, called the namenode. The namenode stores all the metadata for the file system. Because of the relatively low amount of metadata per file (e.g., file names, permissions, and the locations of each block of each file), all of this information can be stored in the main memory of the namenode machine, allowing fast access to the metadata. To access a file, a client (e.g., a Hadoop client) contacts the namenode and retrieves a list of locations for the blocks that comprise the file. These locations identify the data nodes which hold each block. Clients then read file data directly from the data node servers, possibly in parallel. The namenode is not directly involved in this bulk data transfer, keeping its overhead to a minimum.

Figure 1:
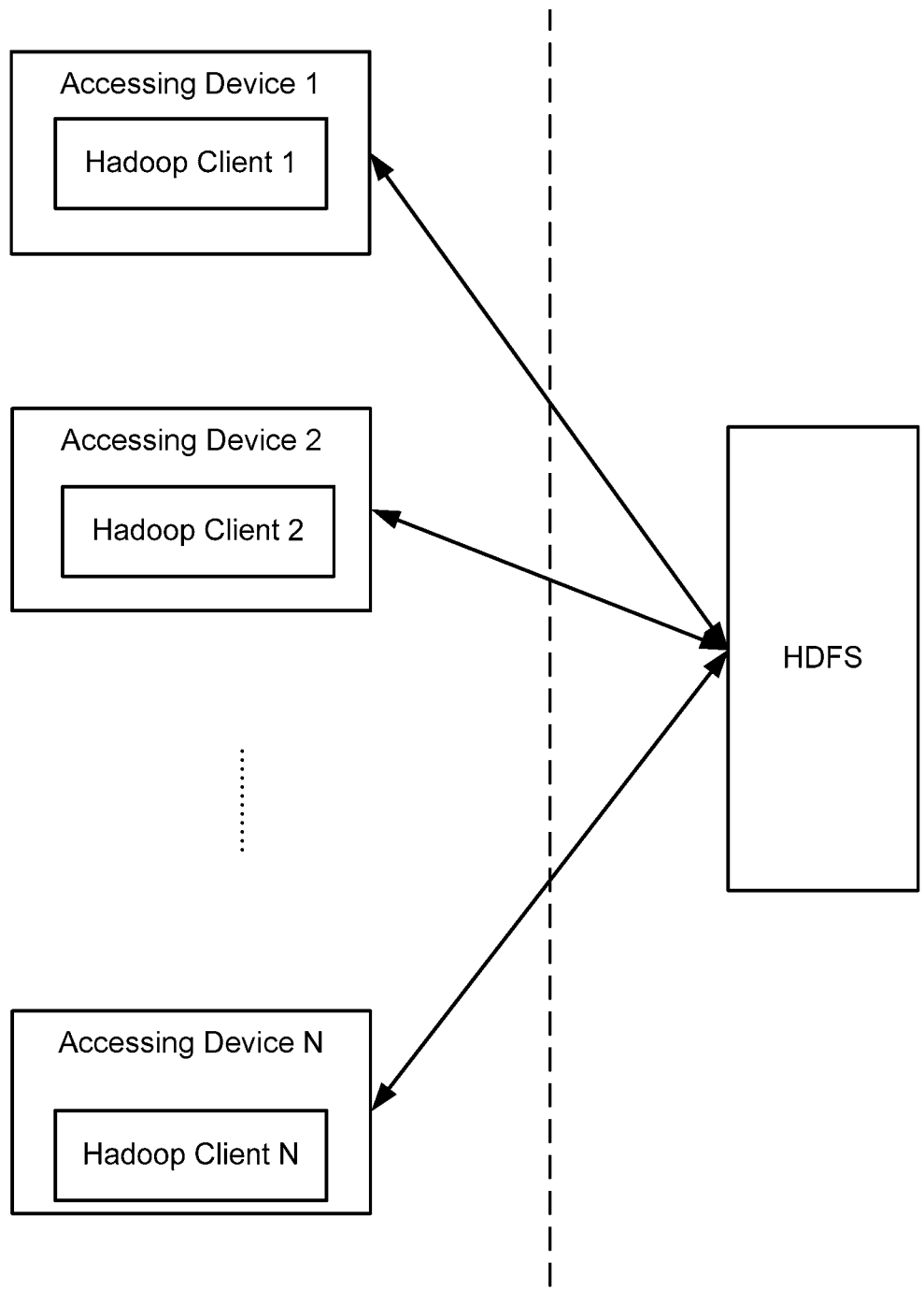
FIG. 1 is a schematic diagram showing the relationship between a conventional accessing device and the HDFS.
Figure 2:
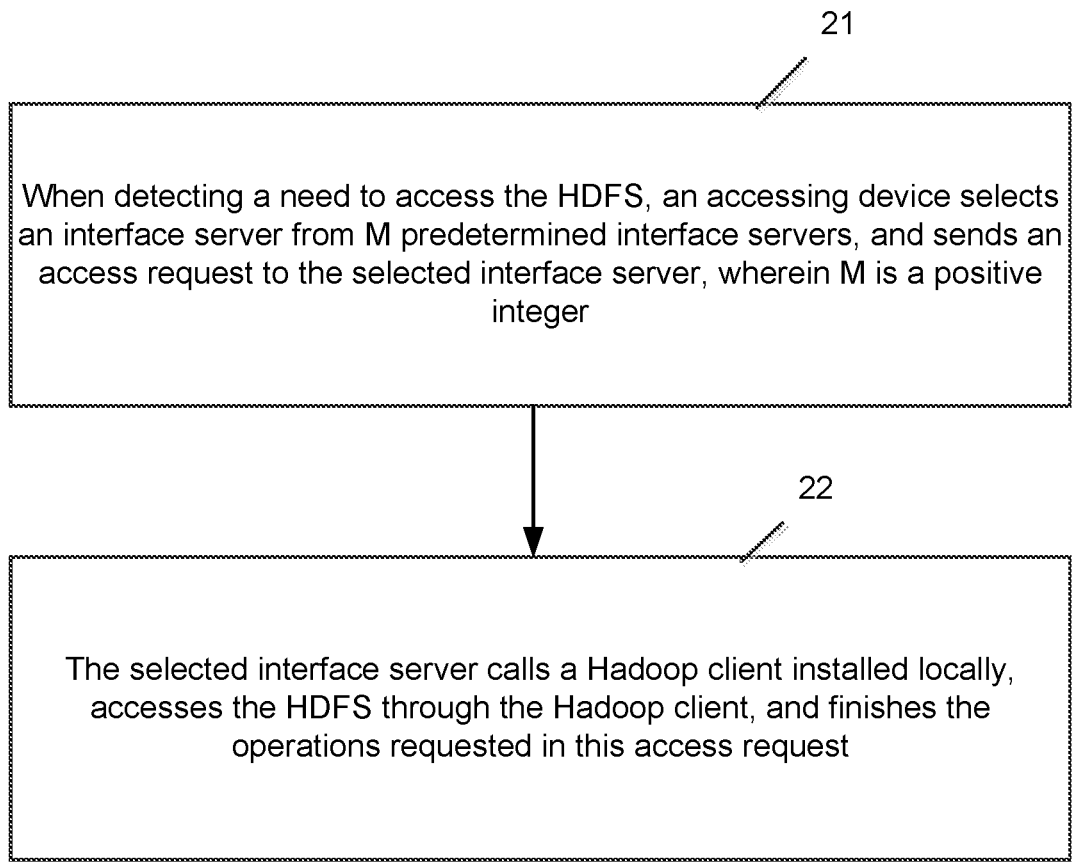
FIG. 2 is a flow chart of a method for accessing an HDFS in accordance with some embodiments.

FIG. 2 is a flow chart of a method for accessing the HDFS in accordance with some embodiments. As shown in FIG. 2, the method includes following steps: 21~22.

Step 21: when a need to access the HDFS is detected by an accessing device, the accessing device selects an interface server from a plurality (e.g., M) of predetermined interface servers, and sends an access request to the selected interface server, where M is a positive integer.

The value of M may be determined in accordance with actual requirement. Usually, for an HDFS system, only a few of interface servers are needed to be arranged, in order to satisfy the requirement for performance. For example, the number of interface servers needed may be a fraction (e.g., 1/20, 1/50, etc.) of the number of accessing devices that may need to access the HDFS.

In some embodiments, when needing to access the HDFS, an accessing device may select an interface server from M predetermined interface servers according to a strategy for load balancing. For example, in some embodiments, the accessing device may randomly choose one of the m predetermined interface server each time it has an access need, while maintaining the probability for choosing each interface device at a level compatible with the relative processing capacity of the interface server. In some embodiments, the accessing devices submit the access requests to a request pool and allow each of the plurality of interface servers to voluntarily choose which request to handle based on the current load on the interface server. In some embodiments, an interface server receiving an access request optionally divides the access request into multiple smaller access requests, and sends one or more of the smaller access requests to other interface servers to handle in parallel.

The implementation of the strategy for load balancing may be determined in accordance with actual requirements. For example, in some embodiments, the accessing device performs a Hash operation on its device identifier (e.g., a unique number assigned to each accessing device), and maps the result of the Hash operation to a respective one of the plurality of interface servers (e.g., by mapping the Hash result to a respective server identifier of the interface server). The respective interface server will be the selected interface server for this particular access request from this particular accessing device.

Once the interface server has been selected by the accessing device, the accessing device establishes a connection with the selected interface server, e.g., using any connection method (e.g., TCP, UDP, etc.), and sends an access request to the selected interface server by using the connection. Particularly, if the accessing device failed to establish the connection with the selected interface server, the accessing device may re-select an interface server (e.g. by random) and try to establish a connection with the newly selected interface server.

In some embodiments, the accessing device may access an interface server by various manners, such as remote network access or calling up a tool, to interact with the interface server, thereby expanding the application range of the HDFS. In some embodiments, an accessing device may send an access request to the selected interface server based on a Remote Procedure Call Protocol (RPC). The RPC is a protocol by which a computer program requests services of a remote server through a network without need of understanding of the details of the underlying layers of the network. For example, through a remote procedure call, a computer program can cause a subroutine or procedure to be executed in another address space (e.g., on another computer on a shared network) without the programmer explicitly coding the details for this remote interaction. An RPC is initiated by the client, which sends a request message to a known remote server to execute a specified procedure with supplied parameters. The remote server sends a response to the client, and the application continues its process.

Step 22: The selected interface server calls a Hadoop client installed locally (e.g., on the interface server itself), accesses the HDFS through the Hadoop client, and finishes the operations requested in this access request.

In some embodiments, each of the M interface servers individually performs following processing steps before receiving an access request from an accessing device: establishing a plurality (e.g., N) of persistent connections (e.g., obtaining connection handles) to the HDFS, and putting the plurality of connections (e.g., the obtained connection handles) into a respective connection pool, where N is a positive integer. That means each interface server maintains a respective connection pool comprising a plurality of persistent connections to the HDFS. A connection handle specifies a data source (e.g., a data node, a namenode, a cluster, etc.) and one or more properties of the connection. For example, the properties of the connection can optionally include the state of the connection, the operations permitted on the data source through the connection, the restrictions on the operations permitted on the data source through the connection, etc. In some embodiments, the connections include other attributes and capabilities, and may be represented by the components of the connection handle. Since the connections in a respective connection pool of an interface server are established and maintained for an extended period of time beyond a single access request received by an interface server, the interface server does not need to reestablish the connections each time it processes an accessing request, thus improving the latency of the access. In some embodiments, the interface server optionally adjusts the number and types of connections maintained in its connection pool in accordance with the total flow of access requests (e.g., the number and types) it has been receiving for a predetermined past period of time (e.g., past hour).

In some embodiments, the selected interface server selects a suitable connection (e.g., by a connection handle of the connection) from its connection pool before calling the Hadoop client installed locally to execute the requested access operations. The Hadoop client can access the HDFS with the selected connection handle. After the operations of this access request are finished, the selected interface server puts the selected connection handle back into its connection pool for future use.

In some embodiments, each interface server may establish one or more connections (e.g., by obtaining respective connection handles) to the HDFS when the interface server is first initialized. The total number of connections in the respective connection pool of each interface server may be determined in accordance with actual requirements, usually larger than one. In this way, the interface server can directly use a connection handle in the connection pool when receiving an access request from an accessing device, without need of establishing a connection handle ad hoc, thereby reducing delay time and further improving the processing speed of the access request.

In some embodiments, the access request may be a reading request or a writing request with respect to a file stored in the HDFS. In some embodiments, when the access request is a reading request for a file stored in the HDFS, the Hadoop client obtains the data that the accessing device requests to read from the HDFS, and returns the data to the accessing device. When the accessing request is a writing request, the Hadoop client writes the data that the accessing device requests to write into the HDFS, and optionally returns a message about successful writing to the accessing device. In some embodiments, the interface server implements other ways of accessing the HDFS on behalf of the accessing device, such as by generating corresponding command line inputs and/or programs for the operations requested in the access request, and sending the command line inputs and/or programs to the HDFS (e.g., to the namenode and/or data nodes relevant to the requested operations).

In some embodiments, after the operations for this access request is finished, the selected interface server puts the selected connection handle back into its connection pool for next use. If the access is failed, the interface server notifies the accessing device of the access failure, and returns the selected connection handle back into the connection pool. In some embodiments, the interface server utilizes multiple connections for the operations generated for a single access request, and the interface server selects the suitable connections from its connection pool based on the match between the respective properties of the operations and the respective properties of the connections.

Figure 3:
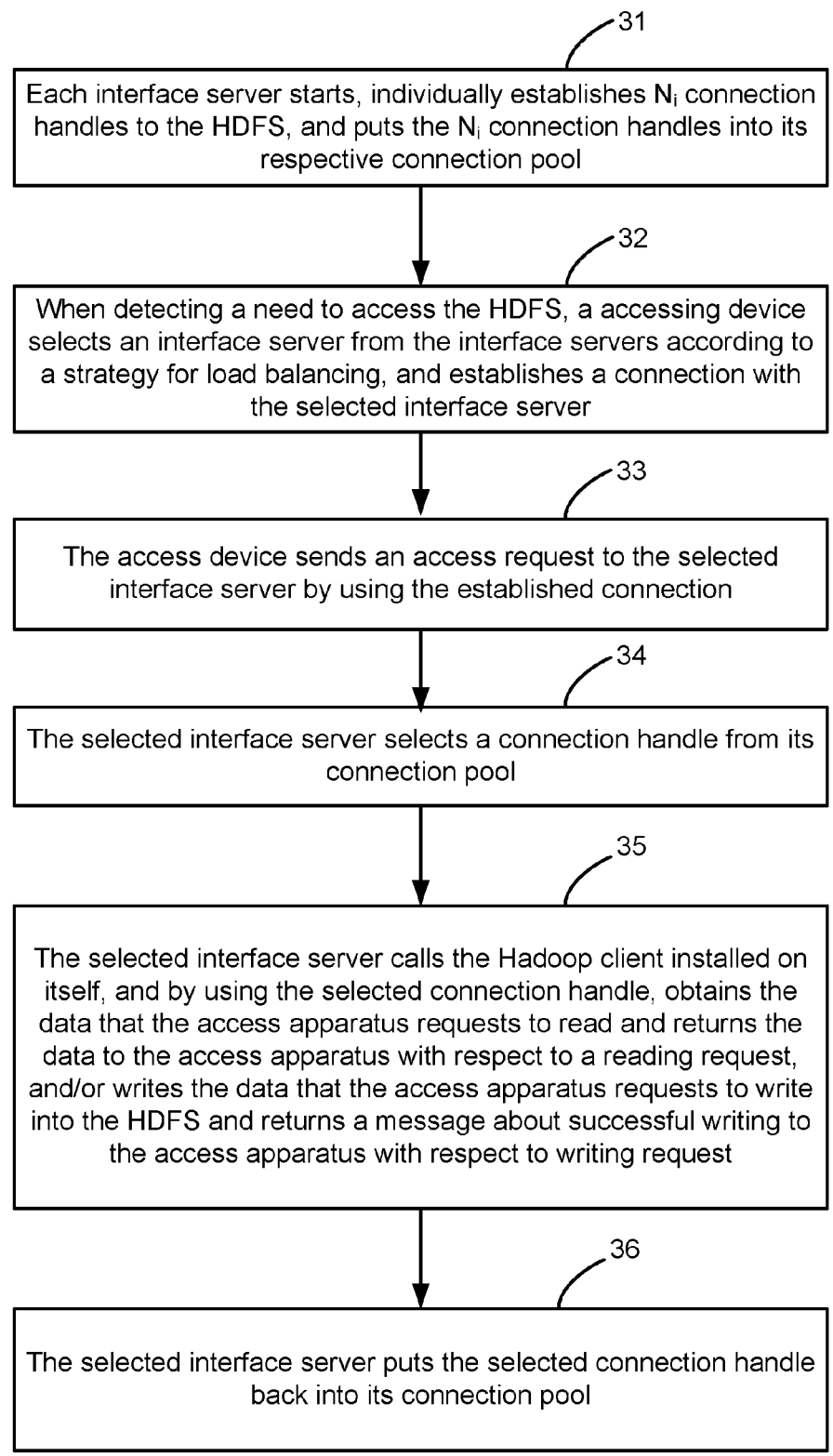
FIG. 3 is a flow chart of a method for accessing an HDFS in accordance with some embodiments.

FIG. 3 is a flow chart of the method for accessing the HDFS in accordance with some embodiments. As shown in FIG. 3, the method includes following steps: 31~36.

Step 31: Each interface server starts, individually establishes a respective plurality (e.g., N) of connection handles to the HDFS, and puts the respective plurality of connection handles into its respective connection pool.

Step 32: When detecting a need to access the HDFS, an accessing device selects an interface server from the plurality of interface servers according to a strategy for load balancing, and establishes a connection with the selected interface server.

Step 33: The accessing device sends an access request to the selected interface server using the established connection.

Step 34: The selected interface server selects a connection handle from its connection pool. For example, the selected interface server optionally chooses the connection handle based on the characteristic of the operations requested in the access request.

Step 35: The selected interface server calls the Hadoop client installed on itself; and the Hadoop client, by using the selected connection handle, obtains the data that the accessing device request to read and returns the data to the accessing device with respect to a reading request, and/or writes the data that the accessing device requests to write into the HDFS and returns a message about the successful writing to the accessing device with respect to a writing request.

Step 36: After the operation(s) requested by the access request are completed, the selected interface server puts the selected connection handle back into its connection pool. In some embodiments, the operations requested by the access request may require multiple sub-parts or multiple steps, and the selected interface server optionally chooses more than one connection handles each for a respective set of sub-part(s) or step(s). Then, the Hadoop client performs the respective set of sub-part(s) or step(s) using respective connection handles.

Figure 4:
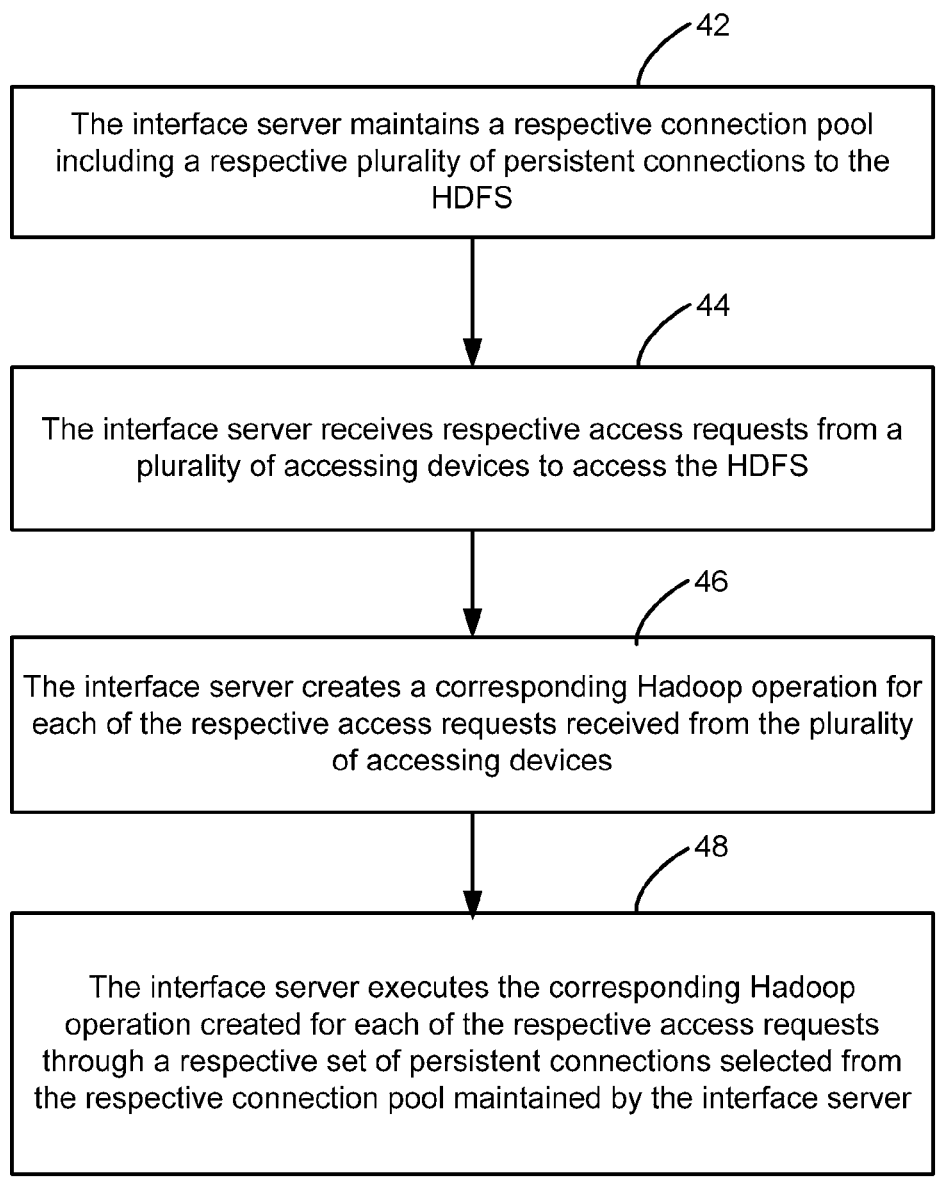
FIG. 4 is a flow chart of a method for providing access to an HDFS in accordance with some embodiments.

FIG. 4 is a flow chart of a method of providing access to a Hadoop Distributed File System (HDFS). The method is performed by an interface server (e.g., the interface server shown in FIG. 9) having one or more processors and memory.

In some embodiments, the interface server maintains (42) a respective connection pool including a respective plurality of persistent connections to the HDFS. In some embodiments, the interface server obtains the connection handles for these connections. In some embodiments, the interface server is one of a plurality of interface servers connected to the HDFS, and the plurality of interface servers each maintains a respective connection pool comprising a respective plurality of persistent connections to the HDFS. In some embodiments, the interface servers have an identical set of connections. In some embodiments, the interface servers do not necessarily maintain the same kinds and numbers of connections as other interface servers.

Figure 5:
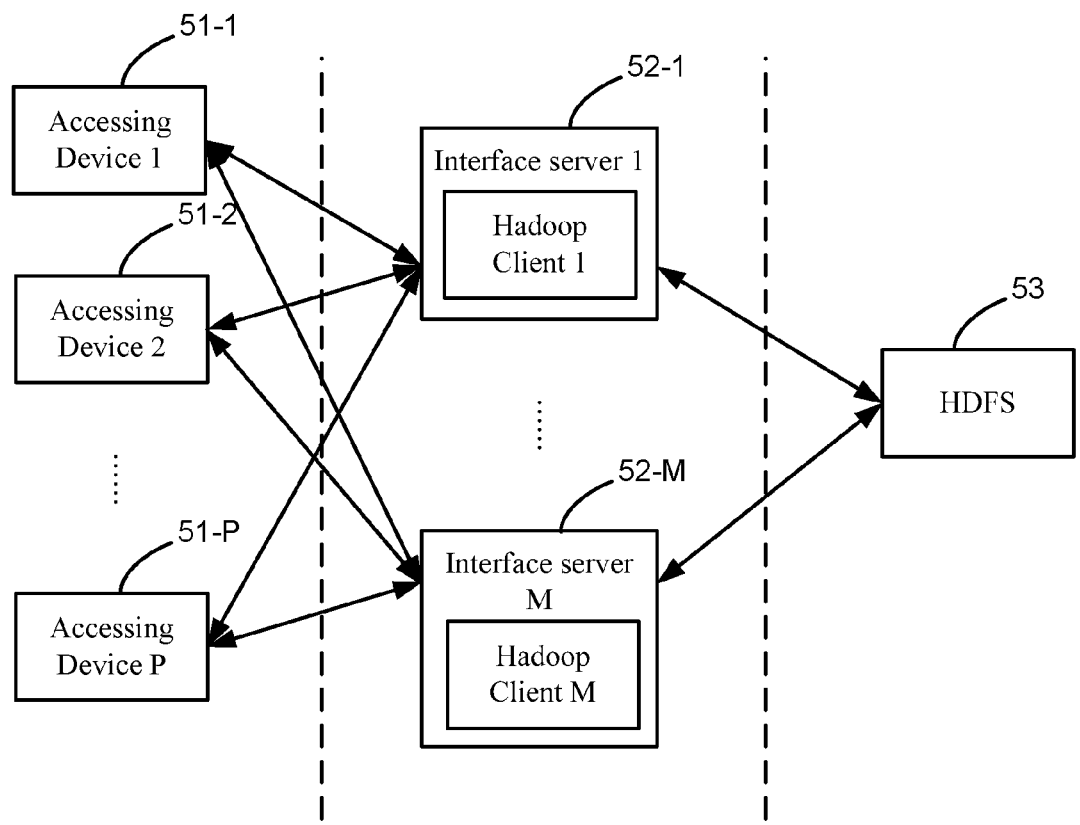
FIG. 5 is a structure block diagram of an access system in accordance with some embodiments.

In some embodiments, the interface server receives (44) respective access requests from a plurality of accessing devices to access the HDFS. In some embodiments, the respective access requests from the plurality of accessing devices are transmitted to the interface server based on a predetermined load balancing criterion established for the plurality of interface servers. For example, each of the accessing devices randomly selects one interface server from all available interface servers for each of its accessing request, where the probability of selecting each particular interface server is equal to the probability for choosing each other interface server. Alternatively, the probability of selecting each particular interface server is proportional to the request processing throughput for the interface server. As shown in FIG. 5, when each of a large number of accessing devices chooses the interface servers for accessing requests generated at different times, each interface server eventually will receive one or more accessing requests from each accessing device.

In some embodiments, the interface server creates (46) a corresponding Hadoop operation for each of the respective access requests received from the plurality of accessing devices, and executes (48) the corresponding Hadoop operation created for each of the respective access requests through a respective set of persistent connections selected from the respective connection pool maintained by the interface server.

In some embodiments, for a first access request of the received respective access requests: the interface server identifies a respective set of data nodes of the HDFS that are targeted by the corresponding Hadoop operation generated for the first access request, where the respective set of persistent connections include persistent connections between the interface server and at least some of the respective set of data nodes. For example, if the first access request includes a read or write request for a particular file, and the blocks of the particular file are stored in a respective set of data nodes, the respective data nodes are targeted by the first access request, and the connections between the interface server and the data nodes in the respective set of data nodes are used to carry out the operation (e.g., the read or write operation) requested by the first access request.

In some embodiments, for a first access request of the received respective access requests: the interface server identifies a respective namenode of the HDFS that is targeted by the corresponding Hadoop operation generated for the first access request, where the respective set of persistent connections include a persistent connection between the interface server and the respective namenode. For example, when the first access request includes a read request or a write request for a particular file, the interface server first needs to contact the namenode of the HDFS to find out which data nodes stores the affected blocks of the file. Thus, the connection between the interface server and the namenode is used first to carry out the operation requested by the first access request.

In some embodiments, the interface server includes a respective Hadoop client for the HDFS, and the corresponding Hadoop operation is executed by the Hadoop client. In some embodiments, the corresponding Hadoop operation is executed by one or more command line inputs provided from the interface server to the HDFS. In some embodiments, the corresponding Hadoop operation is executed by a corresponding program provided from the interface server to the HDFS.

Other details of the method are disclosed in and/or apparent in light of FIGS. 1-3, 5-9 and accompanying descriptions.

FIG. 5 is a structure block diagram of the access system in accordance with some embodiments. As shown in FIG. 5, the system comprises P accessing devices 51 (e.g., accessing devices 51-1, 51-2, . . . 51-P) and M interface servers 52 (e.g., interface servers 52-1, 52-2, . . . , 52-M), where P is a positive integer larger than 1, and M is a positive integer (generally, an integer greater than 1).

In some embodiments, when detecting a need to access the HDFS, a respective accessing device 51 among the plurality of accessing devices selects a respective interface server 52 from the M predetermined interface servers 52, and sends a respective access request to the selected interface server.

When receiving an access request from a respective accessing device 51, a respective interface server 52 calls a Hadoop client installed on itself, and accesses the HDFS through the Hadoop client, and finishes the operation(s) requested in this access request.

Particularly, each accessing device 51 establishes a respective connection with the respective interface server 52 selected for a particular accessing request, and sends the access request to the selected interface server 52 by using the connection (e.g., based on RPC). Thus, as shown in FIG. 5, at any time, each accessing device 51 may have one or more connections to one or more of the interface servers.

Additionally, each interface server 52 establishes $N_i$ connection handles to the HDFS 53, before receiving an access request from any accessing device, and puts the $N_i$ connection handles into a respective connection pool, where N is a positive integer, i is a positive integer and may be different for each interface server.

The interface server 52 selects a connection handle from its connection pool before calling the Hadoop client, so that the Hadoop client accesses the HDFS with the selected connection handle. After the operation requested by this access request is finished, the selected interface server 52 put the selected connection handle back into its connection pool. In some embodiments, the interface server optionally uses other permitted means (e.g., by command line inputs, or by executing one or more programs) to access the HDFS.

Figure 6:
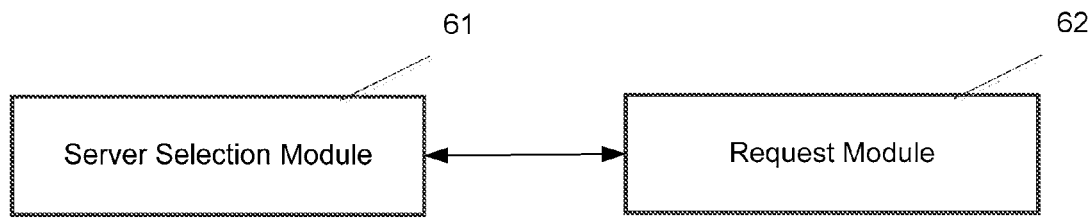
FIG. 6 is a structure block diagram of an accessing device in accordance with some embodiments.

FIG. 6 is a structure block diagram of an accessing device in accordance with some embodiments. As shown in FIG. 6, the accessing device includes: a server selection module 61 and a request module 62. The server selection module 61 is configured to select an interface server from M predetermined interface servers when detecting a need to access the HDFS, and inform a request module 62 that the selected interface server has been selected, where M is a positive integer. In some embodiments, the request module 62 is configured to send an access request to the selected interface server. Particularly, the server selection module 61 selects an interface server from the M predetermined interface servers according to a strategy for load balancing. In some embodiments, the request module 62 establishes a connection with the selected interface server, and sends an access request to the selected interface server by using the connection based on RPC.

Figure 7:
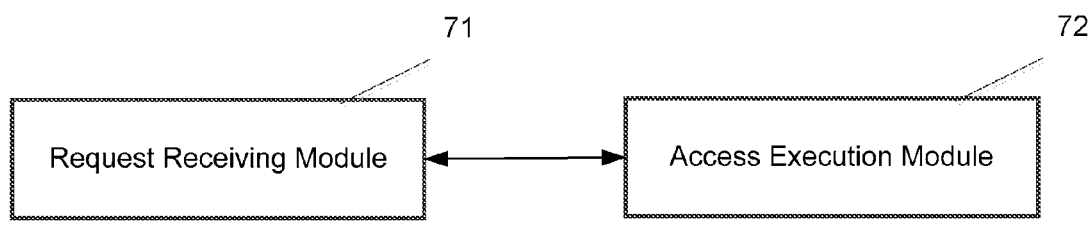
FIG. 7 is a structure block diagram of an interface server in accordance with some embodiments.

FIG. 7 is a structure block diagram of the interface server in accordance with some embodiments. As shown in FIG. 6, the interface server includes: a request receiving module 71 and an access execution module 72. The request receiving module 71 is configured to receive an access request with respect to the HDFS from an accessing device, and sends it to the access execution module 72. The access execution module 72 is configured to call a Hadoop client installed on the interface server, access the HDFS through the Hadoop client, and finishing the operation(s) requested in this access request.

Additionally, the interface server further includes a connection module configured to establish $N_i$ connection handles to the HDFS before receiving an access request from an accessing device, and puts the $N_i$ connection handles into a respective connection pool, where N is a positive integer. Accordingly, access execution module 72 also may further select a suitable connection handle from the connection pool before calling the Hadoop client, so that the Hadoop client can access the HDFS with the selected connection handle. After this access request is finished, the access execution module 72 puts the selected connection handle back into its connection pool.

The operation flows of the system and the apparatus will not be repeated, because it can be known by referring to that flow in the embodiments of the method and relevant explanation provided above.

Figure 8:
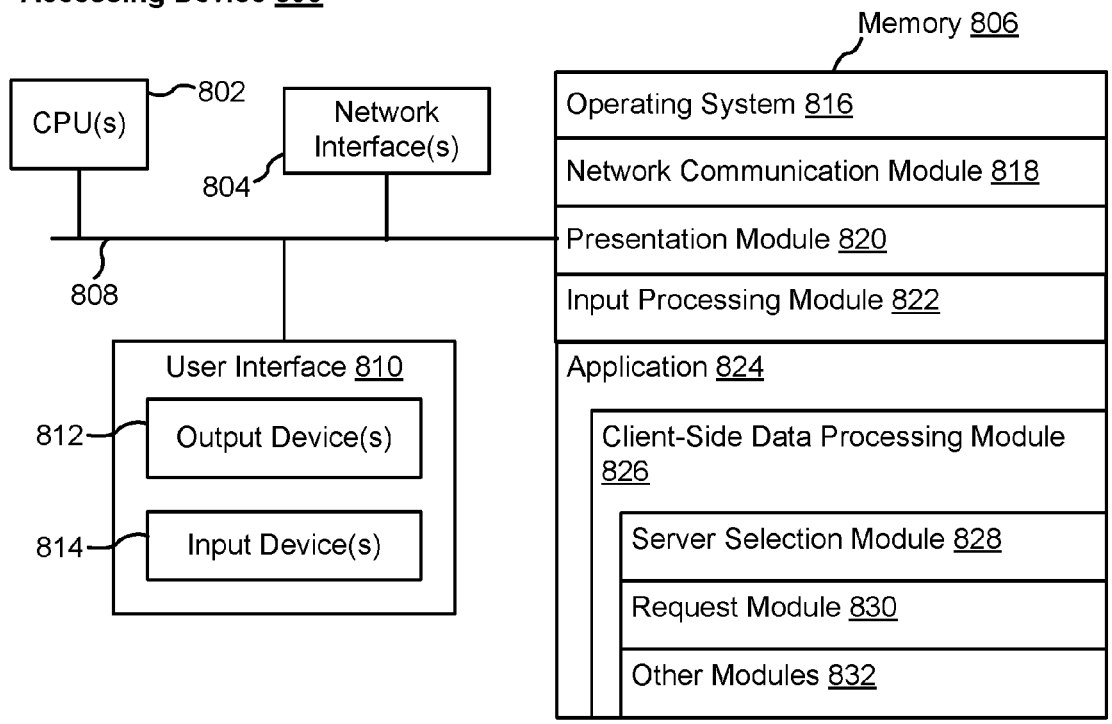
FIG. 8 is a structure block diagram of an accessing device in accordance with some embodiments.

FIG. 8 is a block diagram illustrating a representative accessing device 800 in accordance with some embodiments. Accessing device 800, typically, includes one or more processing units (CPUs) 802, one or more network interfaces 804, memory 806, and one or more communication buses 808 for interconnecting these components (sometimes called a chipset). Accessing device 800 also includes a user interface 810. User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some client devices 800 use a microphone and voice recognition or a camera and gesture recognition to supplement or replace the keyboard. Memory 806 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 806, optionally, includes one or more storage devices remotely located from CPU(s) 802. Memory 806, or alternately the non-volatile memory device(s) within memory 806, includes a non-transitory computer readable storage medium. In some implementations, memory 806, or the non-transitory computer readable storage medium of memory 806, stores the following programs, modules, and data structures, or a subset or superset thereof:

- an operating system 816 including procedures for handling various basic system services and for performing hardware dependent tasks;
- a network communication module 818 for connecting user device 800 to other computers (e.g., interface server system 900) connected to one or more networks via one or more communication network interfaces 804 (wired or wireless);
- a presentation module 820 for enabling presentation of information (e.g., a user interface for a web page or an application program, audio and/or video content, text, etc.) at client device 800 via one or more output devices 812 (e.g., displays, speakers, etc.) associated with user interface 810;
- an input processing module 822 for detecting one or more user inputs or interactions from one of the one or more input devices 814 and interpreting the detected input or interaction; and
- an application module 824 (e.g., a database application, a chat application, etc.), including:
  - a client-side data processing module 826 for processing data access needs of the application, including but not limited to:
    - a server selection module 828 for selecting an interface server for an access request;
    - a request module 830 for sending the access request to the interface server; and
    - other modules 832 for performing some or all of the other functions described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

Figure 9:
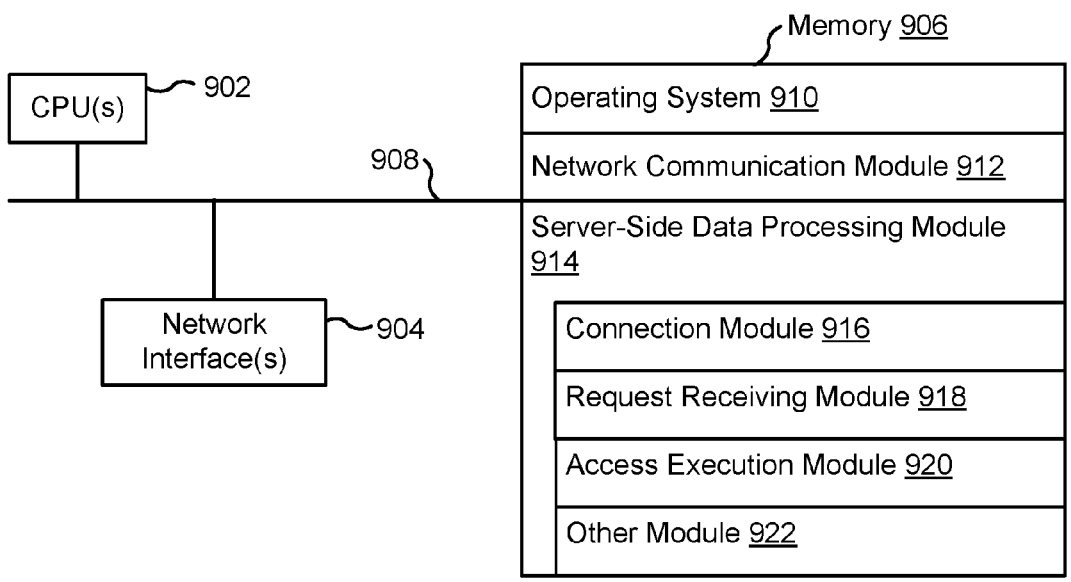
FIG. 9 is a structure block diagram of an interface server in accordance with some embodiments.

FIG. 9 is a block diagram illustrating an interface server system 900 in accordance with some embodiments. Interface server system 900, typically, includes one or more processing units (CPUs) 902, one or more network interfaces 904, memory 906, and one or more communication buses 908 for interconnecting these components (sometimes called a chipset). Memory 906 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 906, optionally, includes one or more storage devices remotely located from the CPU(s) 902. Memory 906, or alternately the non-volatile memory device(s) within memory 906, includes a non-transitory computer readable storage medium. In some implementations, memory 906, or the non-transitory computer readable storage medium of memory 906, stores the following programs, modules, and data structures, or a subset or superset hereof:

- an operating system 910 including procedures for handling various basic system services and for performing hardware dependent tasks;
- a network communication module 912 that is used for connecting the interface server 900 to other computing devices (e.g., accessing device 800) connected to one or more networks via one or more network interfaces 904 (wired or wireless);

a server-side data processing module 914 for enabling the interface server system 900 to serve the data access needs of the accessing devices, including but not limited to:

a connection module 916 for establishing a connection pool comprising a plurality of connections to the HDFS;

a request receiving module 918 for receiving access requests from accessing devices (e.g., accessing device 800);

an access execution module 920 for executing the operation(s) requested by the accessing requests through one or more connections selected from the connection pool; and other modules 922 for performing other functions of the interface server as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

In conclusion, an accessing device can perform accesses to the HDFS through an interface server according to the technical scheme of the present disclosure. Thus, a Hadoop client only needs to be installed on interface servers, and there is no need to install a Hadoop client on the accessing devices. For an HDFS system, usually, only a few interface servers need to be arranged in order to satisfy the data access requirements of all accessing devices. Therefore, the implementation cost will be very low in case of version upgrade of the Hadoop client and etc. That means the implementation cost is significantly reduced comparing to the conventional system in which each accessing device must include its own Hadoop client. Moreover, an accessing device can expand the services in accordance with the requirement by itself, not being reliant on the Hadoop client. Additionally, the processing speed for an access request can be improved by establishing the connection pool. As shown in experiments, the efficiency of reading/writing the HDFS may be raised by more than 50%.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of providing access to a Hadoop Distributed File System (HDFS), comprising:

at an interface server having one or more processors and memory:

maintaining a respective connection pool comprising a respective plurality of persistent connections to the HDFS;

receiving respective access requests from a plurality of accessing devices to access the HDFS;

creating a corresponding Hadoop operation for each of the respective access requests received from the plurality of accessing devices; and executing the corresponding Hadoop operation created for each of the respective access requests through a respective set of persistent connections selected from the respective connection pool maintained by the interface server.

2. The method of claim 1, further comprising:

for a first access request of the received respective access requests:

identifying a respective set of data nodes of the HDFS that are targeted by the corresponding Hadoop operation generated for the first access request, wherein the respective set of persistent connections include persistent connections between the interface server and at least some of the respective set of data nodes.

3. The method of claim 1, further comprising:

for a first access request of the received respective access requests:

identifying a respective namenode of the HDFS that is targeted by the corresponding Hadoop operation generated for the first access request, wherein the respective set of persistent connections include a persistent connection between the interface server and the respective namenode.

4. The method of claim 1, wherein the interface server includes a respective Hadoop client for the HDFS, and the corresponding Hadoop operation is executed by the Hadoop client.

5. The method of claim 1, wherein the corresponding Hadoop operation is executed by one or more command line inputs provided from the interface server to the HDFS.

6. The method of claim 1, wherein the corresponding Hadoop operation is executed by a corresponding program provided from the interface server to the HDFS.

7. The method of claim 1, wherein the interface server is one of a plurality of interface servers connected to the HDFS, and the plurality of interface servers each maintains a respective connection pool comprising a respective plurality of persistent connections to the HDFS.

8. The method of claim 7, wherein the respective access requests from the plurality of accessing devices are transmitted to the interface server based on a predetermined load balancing criterion established for the plurality of interface servers.

9. An interface server for providing access to a Hadoop Distributed File System (HDFS), comprising:
   one or more processors; and
   memory having instructions stored thereon, the instructions, when executed by the one or more processors, cause the processors to perform operations comprising:
      maintaining a respective connection pool comprising a respective plurality of persistent connections to the HDFS;
      receiving respective access requests from a plurality of accessing devices to access the HDFS;
      creating a corresponding Hadoop operation for each of the respective access requests received from the plurality of accessing devices; and
      executing the corresponding Hadoop operation created for each of the respective access requests through a respective set of persistent connections selected from the respective connection pool maintained by the interface server.

10. The interface server of claim 9, wherein the operations further comprise:
   for a first access request of the received respective access requests:
      identifying a respective set of data nodes of the HDFS that are targeted by the corresponding Hadoop operation generated for the first access request, wherein the respective set of persistent connections include persistent connections between the interface server and at least some of the respective set of data nodes.

11. The interface server of claim 9, wherein the operations further comprise:
   for a first access request of the received respective access requests:
      identifying a respective namenode of the HDFS that is targeted by the corresponding Hadoop operation generated for the first access request, wherein the respective set of persistent connections include a persistent connection between the interface server and the respective namenode.

12. The interface server of claim 9, wherein the interface server includes a respective Hadoop client for the HDFS, and wherein executing the corresponding Hadoop operation further comprises executing the corresponding Hadoop operation using the Hadoop client.

13. The interface server of claim 9, wherein executing the corresponding Hadoop operation further comprises:
   executing the corresponding Hadoop operation by providing one or more command line inputs to the HDFS.

14. The interface server of claim 9, wherein executing the corresponding Hadoop operation further comprises:
   providing a respective program for the corresponding Hadoop operation to the HDFS.

15. The interface server of claim 9, wherein the interface server is one of a plurality of interface servers connected to the HDFS, and the plurality of interface servers each maintains a respective connection pool comprising a respective plurality of persistent connections to the HDFS.

16. The interface server of claim 15, wherein the respective access requests from the plurality of accessing devices are transmitted to the interface server based on a predetermined load balancing criterion established for the plurality of interface servers.

17. A non-transitory computer-readable medium having instructions stored thereon, the instructions, when executed by one or more processors, cause the processors to perform operations comprising:
   at an access server that provides access to a Hadoop Distributed File System (HDFS):
      maintaining a respective connection pool comprising a respective plurality of persistent connections to the HDFS;
      receiving respective access requests from a plurality of accessing devices to access the HDFS;
      creating a corresponding Hadoop operation for each of the respective access requests received from the plurality of accessing devices; and
      executing the corresponding Hadoop operation created for each of the respective access requests through a respective set of persistent connections selected from the respective connection pool maintained by the access server.

18. The computer-readable medium of claim 17, wherein the operations further comprise:
   for a first access request of the received respective access requests:
      identifying a respective set of data nodes of the HDFS that are targeted by the corresponding Hadoop operation generated for the first access request, wherein the respective set of persistent connections include persistent connections between the interface server and at least some of the respective set of data nodes.

19. The computer-readable medium of claim 17, wherein the operations further comprise:
   for a first access request of the received respective access requests:
      identifying a respective namenode of the HDFS that is targeted by the corresponding Hadoop operation generated for the first access request, wherein the respective set of persistent connections include a persistent connection between the interface server and the respective namenode.

20. The computer-readable medium of claim 17, wherein the interface server includes a respective Hadoop client for the HDFS, and wherein executing the corresponding Hadoop operation further comprises executing the corresponding Hadoop operation using the Hadoop client.

\* \* \* \* \*